Nov. 4, 1952     V. T. PARÉ     2,616,984
MAGNETO-HYDRAULIC MOTOR FOR TRANSLATING
ELECTRICAL ENERGY INTO SOUND ENERGY
Filed Dec. 30, 1948
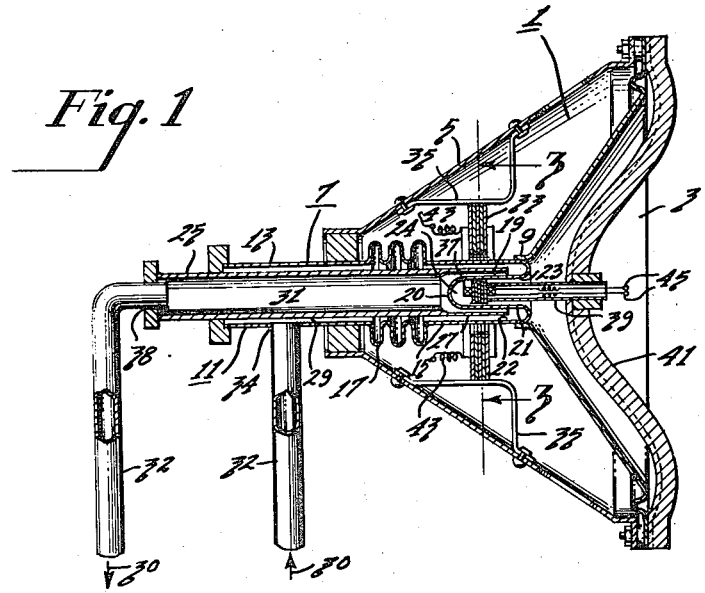
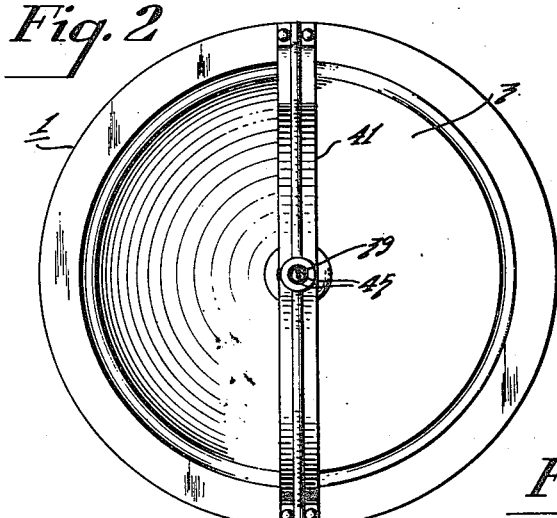
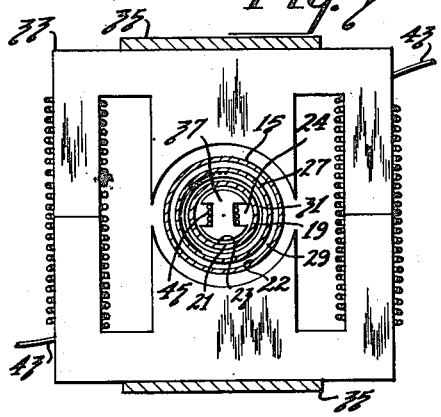
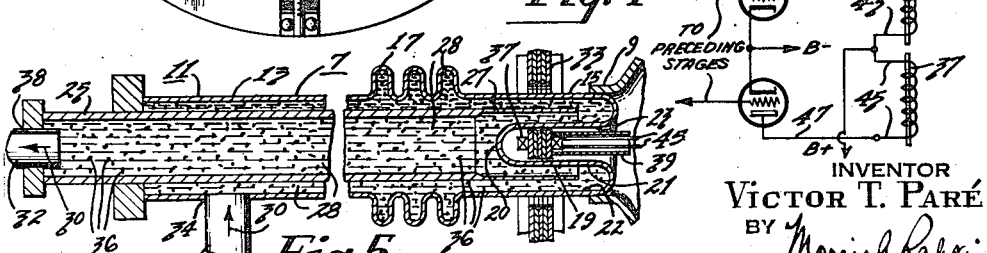
INVENTOR
VICTOR T. PARÉ
BY
ATTORNEY Patented Nov. 4, 1952

2,616,984

UNITED STATES PATENT OFFICE 2,616,984

MAGNETO-HYDRAULIC MOTOR FOR TRANSLATING ELECTRICAL ENERGY INTO SOUND ENERGY

Victor T. Paré, Westmont, N. J., assignor to Radio Corporation of America, a corporation of Delaware Application December 30, 1948, Serial No. 68,368

15 Claims. (Cl. 179—101)

This invention relates to a hydraulic motor for translating electrical energy into mechanical energy, and more particularly to a hydraulic motor useful as the driver element for the diaphragms of sound translating devices such as loud speakers, or the like.

Most conventional, electro-acoustical devices in use at present, such as loudspeakers, are of the dynamic type. In such devices, the driver element, which is used to convert electrical energy into mechanical energy, and hence into sound, comprises a voice coil suspended in a fixed magnetic field. Interaction between the fixed magnetic field and a separate magnetic field set up around the voice coil moves the voice coil and the diaphragm to which it is attached, whereby the latter generates sound waves in a manner well known in the art. While sound translating devices of this type have been found to be satisfactory for most purposes, they are highly inefficient in the sense that the ratio of input power to output power is very high, which means that a major portion of the input power is wasted. The efficiency of the driver element in an electro-acoustical device of this kind will be found to be related not so much to the electrical energy, as supplied from an audio amplifier, as it is to the means for converting that electrical energy into mechanical energy. The primary object of my present invention, therefore, is to provide a motor which will overcome the above, as well as other disadvantages of conventional, present day loudspeakers using moving coil devices.

It is also an object of my invention to provide a novel and improved motor for translating electrical energy into mechanical energy.

It is still another object of my invention to provide an improved motor as the driver element for a dynamic type loudspeaker, which motor makes use of changes in hydraulic forces to supply the driving forces for the loudspeaker.

Another object of my invention is to provide a hydraulic motor for sound translating devices which will have mechanical forces of a high order controlled by relatively weak electrical forces.

In accordance with my present invention, I provide a hydraulic motor comprising an expansible-contractible conduit through which a liquid containing iron particles is circulated at a substantially constant rate. The conduit comprises a fixed or stationary end portion, a movable end portion, and a compliant portion connecting the two end portions. The interior of the conduit is divided into inlet and outlet passages through which the liquid is circulated in opposite directions. A magnet is disposed adjacent the movable end portion and is arranged to provide separate magnetic fields for the two passages, the magnet being adapted to receive its energy from the output stage of any standard push-pull audio amplifier. Inasmuch as the amplifier, under normal operating conditions, produces a variable current output, the magnet will provide a magnetic field of variable intensity. The particles in the liquid, when circulated through the magnetic fields, will be magnetized and mutually attracted, thereby increasing the viscosity of the liquid. Increasing the viscosity of the liquid effects a more rigid coupling between the liquid and the movable end portion of the conduit, and a proportionate amount of the circulating force will thereby be transmitted to the movable end portion causing it to move in the direction the liquid is being circulated, the degree of movement being dependent upon the intensity of the magnetic field.

The novel features characteristic of my invention, as well as additional objects and advantages thereof, will be better understood from the following detailed description of a single embodiment thereof, when read in connection with the accompanying drawing in which, Figure 1 is a central, sectional view of a loudspeaker in accordance with my invention, Figure 2 is a front view of the loudspeaker shown in Figure 1, Figure 3 is an enlarged cross section of the magnetic field structure, taken on the line 3—3 of Figure 1, Figure 4 is an electrical circuit diagram illustrating the magnetic field structure connected to the output stage of a conventional push-pull amplifier, and Figure 5 is an enlarged central sectional view, partly broken away, of the expansible-contractible conduit, showing the liquid containing iron particles in the inlet and outlet passages.

Referring more particularly to the drawing, wherein similar reference characters designate corresponding parts throughout, there is shown, by way of illustration, a loudspeaker 1 which comprises a cone type diaphragm 3 carried by a suitable dishpan support 5. A hydraulic motor 7, also carried by the support 5, is attached to the apex end 9 of the diaphragm and operates as the driving means for vibrating the diaphragm.

The hydraulic motor 7 comprises a flexible conduit 11 having an end portion 13 securely held by the support 5, a movable end portion 15, and a compliant portion 17 which connects the two end portions and permits the conduit to expand and contract along its own axis. The movable end portion 15, to which the apex end 9 of the diahragm is attached, has a reentrant portion 19, the end 20 of which is closed. The reentrant portion 19 is disposed within the conduit 11 with its exterior wall 21 in spaced relation to the interior wall 22 of the conduit. The outer wall 23 of the reentrant end portion forms an external cavity 24 on the movable end of the conduit 11.

A tubular element 25, preferably made of soft steel, which has had the wall thickness of one end 27 thereof reduced, is disposed within the interior of the conduit 11 in spaced relation to the interior walls 21, 22, the reduced end 27 having both its internal and external surfaces highly polished and extending into that portion of the conduit interior between the reentrant portion 19 and the internal wall 22 of the conduit. The tubular element 25 thus divides the interior of the conduit into separate inlet and outlet passages or paths 29, 31, the passages being connected at the end of the movable portion 15 of the conduit.

A suitable, low viscosity, electrically non-conducting fluid in the form of a liquid 28, such as kerosene, or the like, containing finely divided iron particles 36 fills the interior of the conduit 11. The liquid 28 is circulated through the passages 29, 31 in opposite directions parallel to the conduit axis at a substantially constant rate by a suitable displacement pump represented by the arrows 30 in Fig. 1, the pump being connected to the passages by means of pipes 32 which extend respectively through ports 34, 38 in the conduit 11 and tubular element 25.

An electromagnet 33 is attached to the support 5 by means of brackets 35 surrounding the compliant end portion 17 in adjacent, spaced relation thereto and provides a magnetic field for the outer liquid passage 29. Another electromagnet 37 is suspended within the cavity 24 formed in the reentrant end portion 19 by means of a tube 39 supported from a bracket 41 or other suitable support, the latter being disposed across the front of the diaphragm 3 and carried by the support 5. The electromagnet 37 provides a magnetic field for the inner liquid passage 31. Both electromagnets 33, 37 are disposed in a common plane and have connections 43, 45 for coupling them to output connections 47 of a suitable push-pull audio amplifier, as shown in Figure 4 of the drawing. Thus, separate magnetic fields are provided for the liquid passages 29, 31 by the electromagnets 33, 37, with the reduced end portion 27 serving as a common pole piece for both magnets, and, in addition thereto, acting as a magnetic shield between the liquid passages.

In practice, the arrangement will be found to operate in the following manner: If the push-pull amplifier produces no output voltage, the electromagnets 33, 37 will not be energized and the liquid passages 29, 31 will not be subjected to a magnetic field. In that event, the liquid 28 will continue to flow at a high velocity through the system and will have no effect upon the compliant portion of the conduit. However, when the push-pull amplifier produces an output voltage, the electromagnets will, of course, be alternately energized. For example, on the first half cycle, the amplifier output voltage will energize the electromagnet 33 which, in turn, will provide a magnetic field for the outer passage 29. The iron particles 36 suspended in the liquid 28, as they pass through the outer passage magnetic field, will be magnetized and mutually attracted, thereby increasing the viscosity of the liquid. The walls of the inner tube 25 being constructed relatively smooth in comparison to the roughened inner wall 22 of the conduit 11, a binding or clutching effect will be produced between the liquid 28 and the inner wall 22 in the vicinity of the magnetic field. A portion of the liquid circulating force will thereby be transmitted to the compliant end portion with the result that the latter will be driven in the direction of liquid circulation. On the next half cycle, the output voltage will energize the electromagnet 37 in the cavity 23, thereby providing a magnetic field in the inner passage 31 and altering the viscosity of the liquid 28 in that passage. Since the liquid in the inner passage is flowing in a direction opposite to that in the outer passage, the compliant end portion will then be driven in the opposite direction. Thus, the compliant end portion will be moved forward and backward along the longitudinal axis of the conduit. The diaphragm, which is attached to the compliant end portion, will move correspondingly and will thus be caused to vibrate. Inasmuch as the output voltage of the amplifier increases and decreases in response to the signal voltage introduced into the amplifier, it follows that the intensity of the magnetic fields will also vary. The viscosity of the liquid will thus be increased or decreased correspondingly, as the case may be, with the result that the compliant end portion will move and vibrate the diaphragm to thereby produce sound waves of a frequency corresponding to the transmitted signal.

It will, of course, be recognized by those persons skilled in the art that the principle of my invention has wide application, and that it can be applied not only to sound radiating members, but to many other devices wherein precise control of mechanical forces from relatively weak electrical forces is required. Therefore, it is desired that the particular form of my invention described herein shall be considered as illustrative and not as limiting.

What is claimed is:

1. A hydraulic motor comprising an expansible-contractible conduit through which a fluid containing iron particles is adapted to be circulated, and magnetic means disposed adjacent to said conduit for subjecting said iron particles to a magnetic field of variable intensity to thereby alter the viscosity of said fluid and hence to transmit a proportionate part of the fluid circulating force to said conduit whereby to cause said conduit to expand and contract as determined by the intensity of said magnetic field.

2. A hydraulic motor according to claim 1 wherein said conduit has a closed end and is provided with means dividing the interior thereof into inlet and outlet passages which communicate with each other adjacent to said closed end.

3. A hydraulic motor according to claim 2 characterized in that said closed end comprises a reentrant portion the interior surface of which defines a part of one of said passages and the exterior surface of which defines the wall of an axially extending cavity within which a part of said magnetic means is disposed in a position to provide a magnetic field for said one passage.

4. A hydraulic motor according to claim 3 characterized in that another part of said magnetic means is disposed adjacent to the exterior of said end portion in a position to provide a magnetic field for the other of said conduit passages.

5. The invention as set forth in claim 4 wherein means are provided for alternately energizing said parts of said magnetic means.

6. A loudspeaker motor comprising, in combination, a conduit having a compliant wall portion and a closed end portion connected thereto, a liquid containing iron particles filling said conduit, means for circulating said liquid in said conduit at a substantially constant rate, and magnetic means disposed adjacent said closed end portion for subjecting said particles to a magnetic field of variable intensity to thereby alter the viscosity of said liquid, whereby a part of the circulatory force applied to said liquid will be transmitted to said closed end portion and cause it to move in a direction to expand said conduit, the degree of movement being determined by the intensity of said magnetic field.

7. A loudspeaker motor according to claim 6 characterized in that said closed end portion is provided with means dividing the interior of said conduit into separate inlet and outlet passages through which said liquid is circulated in opposite directions.

8. A loudspeaker motor according to claim 7 characterized in that said closed end portion contains a reentrant portion the inner surface of which defines a part of one of said passages and the outer surface of which defines the walls of a cavity within which a part of said magnetic means is disposed in a position to provide a magnetic field for said one of said passages.

9. A loudspeaker motor according to claim 8 characterized in that another part of said magnetic means is disposed adjacent to the exterior of said closed end portion in a position to provide a magnetic field for the other of said passages.

10. A loudspeaker motor according to claim 9 wherein means are provided for alternately energizing said parts of said magnetic means.

11. In a loudspeaker of the type comprising a vibratile member, a support and a fluid type motor comprising a circulatory system which includes a compliant conduit through which a fluid is adapted to be circulated and means for circulating said fluid through said system at a substantially constant rate, the combination with said system of a variable viscosity fluid in said compliant conduit, said fluid being subject to viscosity variation upon establishment of a variable magnetic field therethrough, and magnet means providing a magnetic field of variable intensity, said magnet means being carried by said support and disposed adjacent said conduit for subjecting said liquid to said magnetic field whereby a part of said liquid circulating force will be transmitted to said conduit and hence to said vibratile member by a friction coupling effect produced between said liquid and said conduit, the degree of movement of said conduit and said vibratile member being dependent upon the intensity of said magnetic field.

12. A loudspeaker according to claim 11 characterized in that said conduit has a compliant portion and an end portion connecting said compliant portion to said vibratile member, and further characterized in that said end portion includes a closed, reentrant portion the exterior surface of which defines the walls of a cavity within which a part of said magnet means is disposed.

13. A loudspeaker according to claim 12 wherein said end portion is provided with means dividing the interior thereof into separate inlet and outlet passages through which said liquid is circulated in opposite directions, and wherein said reentrant end defines a part of one of said passages.

14. A loudspeaker according to claim 13 wherein another part of said magnet means is disposed adjacent to the exterior of said end portion in a position to provide a magnetic field for one of said passages, and said first mentioned part of said magnet means provides a magnetic field for the other of said passages.

15. A loudspeaker according to claim 14 wherein means are provided for alternately energizing said parts of said magnetic means whereby when said liquid in said one passage is subjected to a magnetic field said conduit will be expanded, and when said liquid in the other of said passages is subjected to a magnetic field said conduit will be contracted.

VICTOR T. PARÉ.

REFERENCES CITED

The following references are of record in the file of this patent:

UNITED STATES PATENTS

| Number | Name | Date |
| --- | --- | --- |
| 1,929,569 | Stone | Oct. 10, 1933 |
| 2,458,043 | Zenner | Jan. 4, 1949 |